United States Patent [19]

Nattel

[11] 4,392,012
[45] Jul. 5, 1983

[54] ELECTRICAL WIRING BOX ARRANGEMENT WITH ALIGNABLE GROUNDING STRAP

[75] Inventor: William Nattel, Montreal, Canada
[73] Assignee: GTE Sylvania Canada Limited, Montreal, Canada
[21] Appl. No.: 310,712
[22] Filed: Oct. 13, 1981
[51] Int. Cl.³ ............................................. H02G 3/08
[52] U.S. Cl. .................................... 174/51; 339/14 R
[58] Field of Search ................. 174/51, 53; 339/14 R, 339/14 L

[56] References Cited

U.S. PATENT DOCUMENTS

| | | | |
|---|---|---|---|
| 3,119,895 | 1/1964 | Palmer | 174/51 |
| 3,210,458 | 10/1965 | Palmer | 174/51 |
| 3,609,213 | 9/1971 | Winter et al. | 174/51 |
| 3,639,884 | 2/1972 | Drapkin | 339/14 R |
| 3,784,953 | 1/1974 | Lingaraju | 339/14 R |
| 3,786,399 | 1/1974 | McHattie | 339/14 R |
| 3,835,438 | 9/1974 | Longworth, Jr. | 339/14 R |
| 3,885,847 | 5/1975 | Thibeault | 339/14 R |
| 3,890,026 | 6/1975 | Gartland, Jr. | 339/21 R |
| 3,963,292 | 6/1976 | Smith | 339/14 R |
| 4,203,638 | 5/1980 | Tansi | 339/14 P |
| 4,306,109 | 12/1981 | Nattel | 174/51 |
| 4,315,100 | 2/1982 | Haslbeck et al. | 174/51 |

OTHER PUBLICATIONS

Promotional literature, "Self Clamp & Thread" by Highland Mfg. Company Ltd., Burnaby, B. C., Canada.

Primary Examiner—A. T. Grimley
Assistant Examiner—D. A. Tone
Attorney, Agent, or Firm—David M. Keay; Jerry F. Janssen

[57] ABSTRACT

Electrical wiring box arrangments comprise a wiring box with a wall structure having a channel for slideably receiving a gripping member for engaging the mounting screw of a wiring device mounted in the box. The gripping member comprises a body having two opposed elements which engage and grip the threads of the mounting screw. Inwardly tapering wall portions of the box wall channel urge the two gripping member elements toward one another as the mounting screw is tightened, insuring a firm grip between the mounting screw and the gripping member.

7 Claims, 7 Drawing Figures

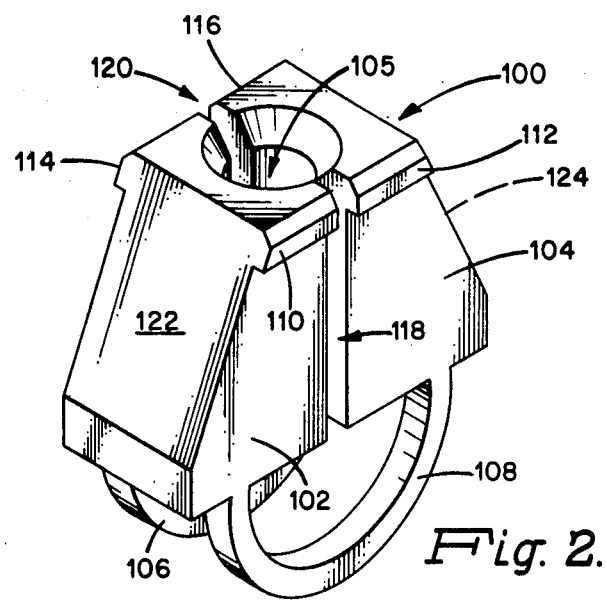
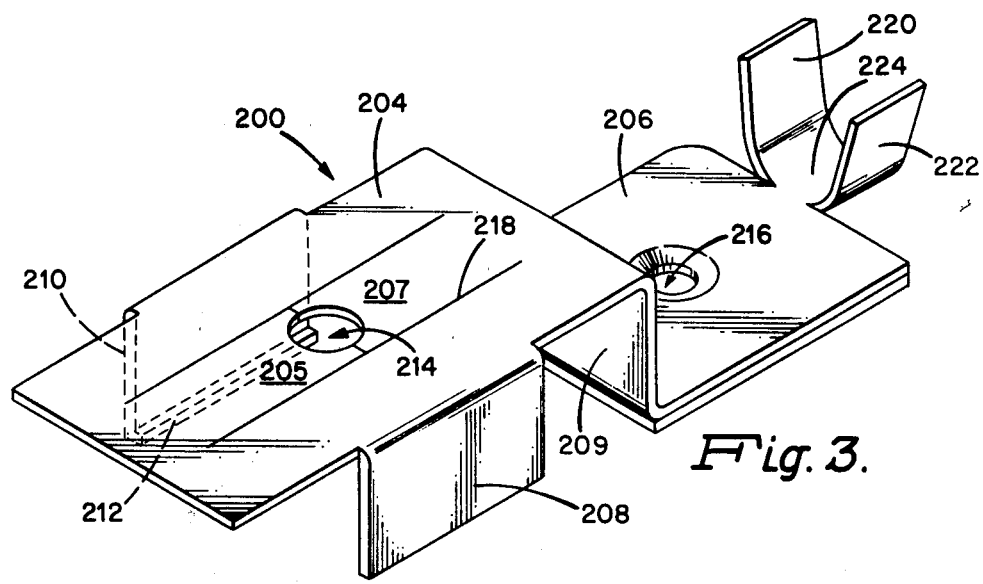

ELECTRICAL WIRING BOX ARRANGEMENT WITH ALIGNABLE GROUNDING STRAP

CROSS-REFERENCE TO RELATED APPLICATIONS

This application relates to material disclosed and claimed in co-pending application Ser. No. 310,711 filed Oct. 13, 1981 in the name of William Nattel and assigned to the present assignee.

BACKGROUND OF THE INVENTION

This invention relates to electrical wiring box arrangements. More particularly, it is concerned with electrically non-conductive wiring box arrangements having provision for the electrical grounding of a device mounted in such wiring boxes.

Generally, the electrical grounding of metallic wiring boxes or of wiring devices mounted in such boxes does not present a problem. It is a common practice to provide metal wiring boxes and certain wiring devices, such as duplex outlets, with a grounding lug for the direct attachment of the ground conductor wire of an electrical cable, although some wiring devices such as switches are not generally provided with such a grounding lug.

Duplex outlets of a type described in U.S. Pat. No. 3,032,736 to Howells which provide an electrical connection within the device between the grounding pin socket and the mounting yoke are now in common use. The firm mounting of such devices in a metallic wiring box results in electrical grounding of both the device and the box whether the ground conductor wire of the cable is attached to the ground lug of the box or the device, provided however, that there is firm electrical contact between the wiring box and the wiring device mounting yoke. Firm electrical contact may be a problem under some conditions because of the oversized mounting screw openings regularly provided in wiring device mounting yokes.

Numerous arrangements have been described in the prior art to insure firm electrical contact between the mounting yoke of a wiring device and a metal wiring box including clips, springs, or other devices which firmly engage the mounting screw. However, the increasing use in the building trades of plastic or other electrically non-conductive wiring boxes has created the need for some means of electrically grounding both the mounting yoke and mounting screw of wiring devices mounted in such boxes. The possibility arises in some situations that the wiring device mounting screw may become energized by coming into contact with a current-bearing conductor of the electrical cable. In such circumstances, the mounting screw or metal faceplate in contact with the mounting screw become potential sources of electrical shock hazard. This problem is especially acute when the wiring device is not provided with a grounding lug, as in the case of a switch device.

Clip devices of a type which rigidly attach to the wall of an electrically non-conductive wiring box and which provide an attachment lug for the ground conductor of the electrical cable are known in the art. Some of these clip devices provide for a tight fit between the mounting screw and the clip device and thus assure efficient electrical contact between the screw and the clip. However, because they are mounted rigidly to the wiring box wall, these devices generally make no provision for alignment of the mounting screw as it passes through the clip device into the screw-receiving member of the wiring box wall. When the mounting screw is driven through the clip device and into the box wall screw receiving member, improper alignment of the two results in considerable strain placed upon the assembly.

When the mounting screw of a wiring device is retained in the box wall by the simple expedient of a threaded hole in the soft wall of a plastic wiring box, this strain can result in stripping the threads, leading to unsatisfactory mounting of the wiring device in the box. Moreover, such improper alignment can result in poor electrical contact between the wiring device mounting screw and the yoke member of the wiring device resulting in poor electrical grounding.

SUMMARY OF THE INVENTION

Electrical wiring box arrangements in accordance with the present invention provide electrically non-conductive wiring boxes having a grounding member for electrically grounding the mounting screw of a device mounted in the box. The grounding member attaches to the wall structure of the box and is laterally slideable to permit proper alignment of the grounding member screw receiving opening and the screw retaining member of the box wall structure.

Electrical wiring box arrangements in accordance with the present invention comprise, in combination, an electrical wiring box and a grounding member.

The wiring box includes a wall structure having front-to-rear walls and a rear wall therebetween which together define a chamber within the box with a forward facing opening for receiving a wiring device.

The wall structure further includes support means for seatably receiving and supporting the grounding member and the yoke members of the electrical wiring device. The support means includes screw retaining means for receiving and retaining the mounting screw of the wiring device.

The box wall structure further includes first and second retaining means for retaining the grounding member against outward removal from the box in a direction toward said forward facing opening while permitting lateral slideable movement of the grounding member for alignment of the grounding member screw receiving means and the box wall screw retaining means.

The grounding member includes a screw receiving aperture and deformable tabs for engaging the mounting screw of a wiring device and for making electrical contact with the screw. The grounding member includes a grounding lug for attachment of the ground conductor wire of an electrical cable, and a conductive pathway between the grounding lug and the tabs engaging the mounting screw of the wiring device.

First and second attachment means on said grounding member coact with the first and second retaining means of the wiring box wall structure to attach the grounding member to the box while permitting lateral sliding movement to align the grounding member and wiring box screw retaining means prior to the installation of the wiring device in the box.

BRIEF DESCRIPTION OF THE DRAWING

In the drawing:

FIG. 2 is a detailed perspective view of a gripping member in accordance with one embodiment of a wiring box arrangement of the present invention.

FIG. 3 is a detailed perspective view of a grounding member in accordance with one embodiment of a wiring box arrangement of the present invention.

For a better understanding of the present invention, together with other and further objects, advantages, and capabilities thereof, reference is made to the following diclosure and appended claims in connection with the above-described drawings.

DESCRIPTION OF THE PREFERRED EMBODIMENTS

Figure 1:
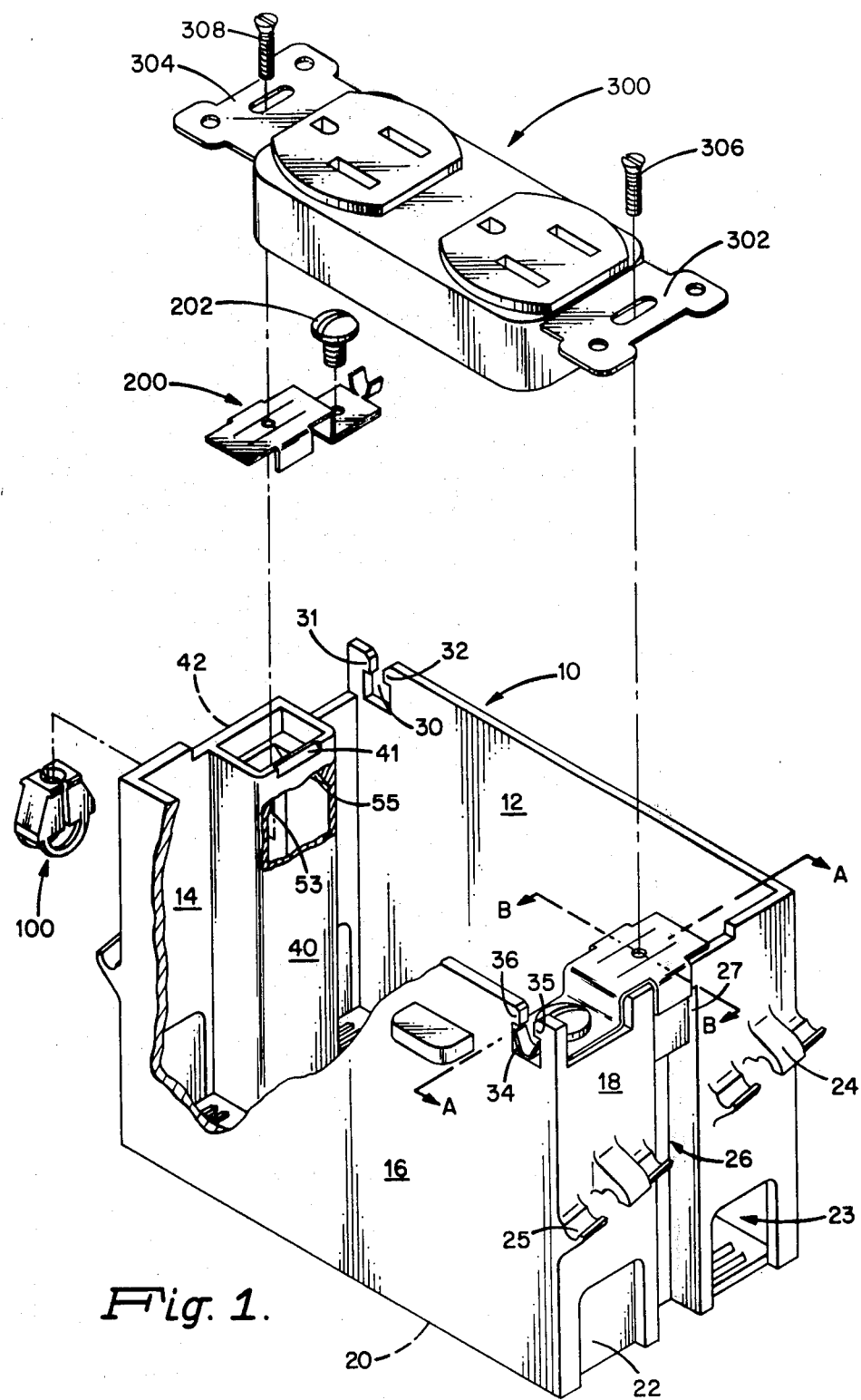
FIG. 1 is an exploded, partially cut-away perspective view of an electrical wiring box arrangement in accordance with the present invention.

Referring to FIG. 1, a preferred embodiment of the wiring box arrangement of the present invention is shown in exploded and partially cut-away view. The electrical wiring box 10 comprises front-to-rear walls including side walls 12 and 16 and end walls 14 and 18. Rear wall 20 connects the front-to-rear walls to provide a chamber having a forward facing opening for receiving a wiring device such as duplex outlet 300.

The wiring box is preferably molded by conventional molding techniques of a plastic or resinous material such as polyethylene, polypropylene, polytetrafluoroethylene, polyvinyl chloride, phenol-formaldehyde resin or the like. The box may be provided with integrally molded features such as nail-up lugs 24 and 25, and frangible knock-outs such as 22.

Each end wall 14 and 18 of the wiring box is provided with a support structure or member to provide a seat for receiving the grounding member 200 and the mounting yoke members 302 and 304 of the wiring device 300. These support members may take the form of a boss centered in each end wall or, as in the embodiment illustrated in FIG. 1, the flat end face of the box wall structure indented to form a channel such as 26 in end wall 18.

The grounding member 200 is shown in greater detail in the perspective view depicted in FIG. 3. The member 200 is formed as a Z-shaped element from steel or other metal or electrically conductive material having the requisite strength and resilience. The grounding member 200 is conveniently formed by stamping or other conventional techniques known in the metal working arts.

The grounding member 200 has two substantially parallel leg portions 204 and 206 interconnected by a connecting portion 209. Leg portion 206 is preferably folded over to provide a double thickness of material and then embossed to provide an opening 216 which is internally threaded to receive the grounding lug screw 202 of FIG. 1. Leg portion 206 is further provided with a U-shaped clip portion 224 with upturned ears 220 and 222.

Leg portion 204 of the grounding member 200 is provided with an H-shaped cut 218 with an opening or aperture 214 centered on the cross-bar of the H-shaped cut. The cut and aperture provide leg portion 204 with deformable regions 205 and 207 between the legs of the H-shaped cut. The screw receiving opening 214 is of a size smaller than the standard diameter of wiring device mounting screws such that passage of the mounting screw through the aperture 214 deforms the tabs 205 and 207 downward. This permits the mounting screw to be pushed through the opening without being turned, facilitating the rapid installation of the wiring device in a box having the grounding member of this invention. Once forced through opening 214, however, the mounting screw is firmly engaged against movement in the opposite direction without being turned with a screwdriver or like tool. The resilient tabs 205 and 207, having been deformed by insertion of the mounting screw, bear against the screw, making firm electrical contact with the screw.

Leg portion 204 of the grounding member 200 is further provided with leg members 208 and 210 which are substantially at right angles with leg portion 204. Leg member 210 is further provided with a foot portion 212.

Figure 6:
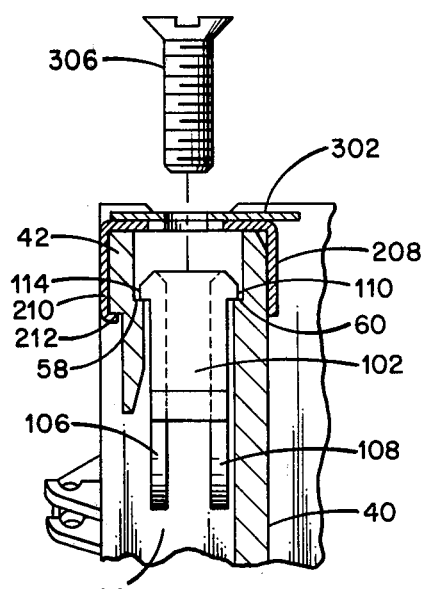
FIGS. 6 and 7 are partial cut-away views of the wiring box arrangement of FIG. 1, taken along the cut B—B.
Figure 7:
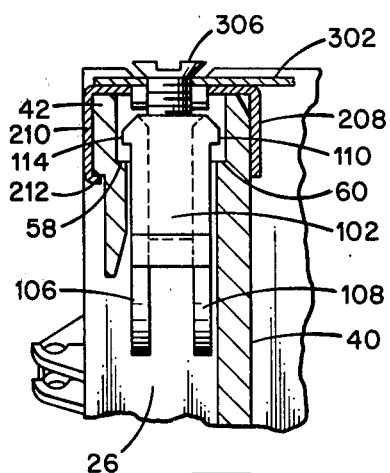

Details of the attachment of grounding member 200 to the wiring box can be seen by reference to FIGS. 6 and 7. The wiring box wall structure provides a support member 42 on which the grounding member 200 is seated. Substantially parallel leg members 208 and 210 bear oppositely against opposite outer surfaces of the support member 42. Foot portion 212 of leg 210 engages an indentation in the box wall structure to prevent removal of the grounding member 200 in a direction toward the forward facing opening of the box.

Referring again to FIG. 1, it can be seen that the indentation 27 in the box wall which engages the foot portion 210 of the grounding member is of a width greater than that of leg portion 210. This permits lateral sliding movement of the grounding member even though the member is clipped in place, seated on the box wall support member.

Further retention of the grounding member against removal from the box is provided by the action of the U-shaped clip 224 coacting with the notch provided in the box wall. In FIG. 1, at the near end of the box presented in perspective view, the grounding member is shown clipped into place. The notch 34 in box side wall 16 has received the U-shaped clip member of the grounding member 200 and retains the member by the action of clip ears 220 and 222 snapping into place behind protrusions 35 and 36 in the notch 34. By this manner, the grounding member is further held in place in the box wall while still permitting lateral sliding movement of the grounding member to insure alignment of the screw receiving opening 214 of the grounding member and the screw retaining means of the wiring box wall.

In the embodiment shown in FIG. 2, the wiring box screw retaining member 100 comprises an insert which fits into the channel (e.g. 26) in each end wall of the wiring box. This mounting screw gripping member is disclosed and claimed in copending application Ser. No. 310,711 filed Oct. 13, 1981. However, the mounting screw retaining means of the wiring box wall structure may take any of several well known arrangements described in the prior art such as a threaded opening in the box wall, or a screw receiving opening having a metal insert. Whatever form the screw retaining member of the wiring box wall takes, the grounding member of this invention permits lateral slideable movement of the member prior to insertion of the mounting screw, insuring proper alignment of the screw receiving openings of both the member and the box wall. Thus, any possibility of strain or improper alignment of the mounting screw and grounding member is eliminated and firm electrical contact between the screw and the grounding member is assured.

Figure 4:
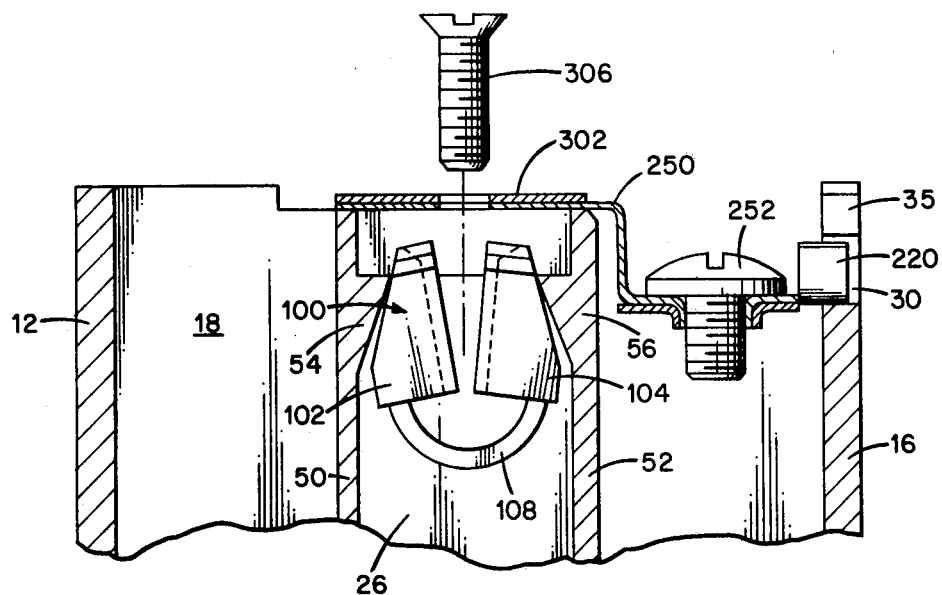
FIGS. 4 and 5 are partial cut-away views of the wiring box arrangement of FIG. 1, taken along the cut A—A.
Figure 5:
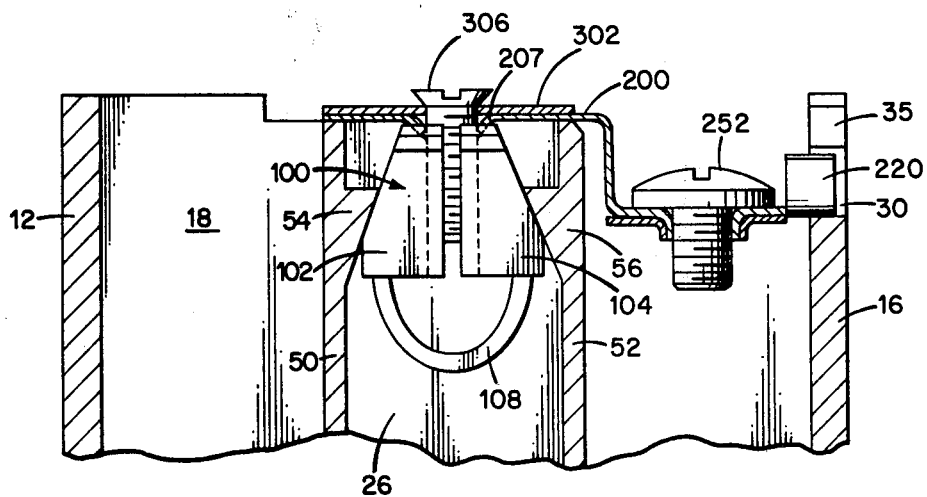

Electrical grounding connection with the external electrical circuit is achieved by attachment of the ground conductor wire of the electrical cable to the ground lug 252 shown in FIGS. 4 and 5.

While there have been shown and described what are at present considered the preferred embodiments of the present invention, it will be obvious to those skilled in the art that various changes and modifications may be made therein without departing from the scope of the invention as defined by the appended claims.

What is claimed is:

1. An electrical wiring box arrangement including in combination, an electrical wiring box and a grounding member;

said wiring box including:
a wall structure comprising front-to-rear walls and a rear wall therebetween which together define a chamber within the box with a forward facing opening for receiving an electrical wiring device,
said wall structure including support means for seatably receiving said grounding member and the mounting yoke of a wiring device mounted in said box chamber, said support means including screw retaining means for retaining the mounting screw of said wiring device,
said wall structure further including first and second retaining means for retaining said grounding member against outward removal from said box in a direction toward said forward facing opening while permitting lateral slideable movement of said grounding member;

said grounding member including:
screw receiving means for receiving said wiring device mounting screw and providing electrical contact between said mounting screw and said grounding member,
means for attaching the ground conductor wire of an electrical cable,
electrically conductive pathway means between said screw receiving means and said ground conductor wire attachment means, and
first and second attachment means for coacting with said box wall first and second retaining means to attach said grounding member to said box wall structure;

whereby said grounding member is received and seated on said box wall support means and retained by said grounding member attachment means coacting with said box wall retaining means to attach said grounding member to said box wall structure while permitting lateral sliding movement of said grounding member to permit direct alignment of said screw receiving means of said grounding member and said screw retaining means of said box wall support member, the mounting screw of a wiring device mounted in said box chamber passing through said grounding member screw receiving means making firm electrical contact with said grounding member, and being received and retained by said screw retaining means of said box wall support means.

2. An electrical wiring box arrangement in accordance with claim 1 wherein said grounding member comprises a Z-shaped member having first and second substantially parallel leg portions and a connecting portion lying therebetween, said first leg portion adapted to be seatably received on said wiring box wall structure support means and having first attachment means for coacting with said first retaining means of said wiring box wall structure to attach said grounding member to said box wall structure, said first leg portion further having screw receiving means for receiving said mounting screw of said wiring device.

3. An electrical wiring box arrangement in accordance with claim 2 wherein said screw receiving means of said grounding member comprises an H-shaped cut in said grounding member, said member having an aperture centered on the cross-bar of said H-shaped cut, said aperture being of a size smaller than the diameter of the mounting screw of said wiring device, whereby passage of said mounting screw through said aperture deforms the portions of said grounding member lying between the legs of said H-shaped cut to permit facile movement of said mounting screw in one direction through said grounding member while retaining said screw against movement in the opposite direction through said grounding member, the deformed portions of said grounding member bearing oppositely against said mounting screw to make firm electrical contact therewith.

4. An electrical wiring box arrangement in accordance with claim 2 wherein said first attachment means of said grounding member comprises first and second substantially parallel leg members attached to said first leg portion of said grounding member, said first and second leg members each being substantially at right angles with said first grounding member leg portion, said first leg member comprising an L-shaped member having a foot portion adapted to coact with said first box wall retaining means.

5. An electrical wiring box arrangement in accordance with claim 4 wherein said first retaining means of said wiring box wall structure comprises a slotted indentation in said wiring box wall structure adapted to receive said foot portion of said first leg member of said grounding member, said slotted indentation being of a width greater than said foot portion whereby said grounding member is permitted lateral slideable movement.

6. An electrical wiring box arrangement in accordance with claim 2 wherein said second attachment means of said grounding member comprises a U-shaped clip portion of said second leg region of said grounding member, said U-shaped clip portion having first and second ears adapted to be slideably received by and to coact with said second box wall retaining means to retain said grounding member slideably attached to said wiring box.

7. An electrical wiring box arrangement in accordance with claim 6 wherein said second retaining means of said wiring box wall structure comprises a notch in said front-to-rear wall structure of said wiring box, said notch lying immediately adjacent said forward facing opening of said wiring box, said wall structure having protrusions extending into said notch for coacting with said first and second ears of said U-shaped clip portion of said grounding member for retaining said grounding member slideably attached to said wiring box.

* * * * *